Aug. 8, 1933.    J. F. BLAKE    1,921,280
COMBINATION CHECK AND GATE VALVE
Filed Sept. 8, 1930

INVENTOR
James F. Blake
BY Arthur C. Brown
ATTORNEY

Patented Aug. 8, 1933

1,921,280

UNITED STATES PATENT OFFICE 1,921,280

COMBINATION CHECK AND GATE VALVE

James F. Blake, Tulsa, Okla.

Application September 8, 1930. Serial No. 480,368

2 Claims. (Cl. 277—23)

My invention relates to valves and more particularly to a combination gate and check valve; the principal object of the invention being to provide a device of this character embodying both the advantages of a gate and check valve so that fluid will be permitted to flow in one direction through the line but will be restricted from flowing through the line in the opposite direction.

A further object of the invention is to provide a valve embodying these features that may be readily disassembled for repair or replacement of parts.

In accomplishing these and other objects of my invention I have provided improved details of structure the preferred form of which is illustrated in the accompanying drawing, wherein.

Figure 1:
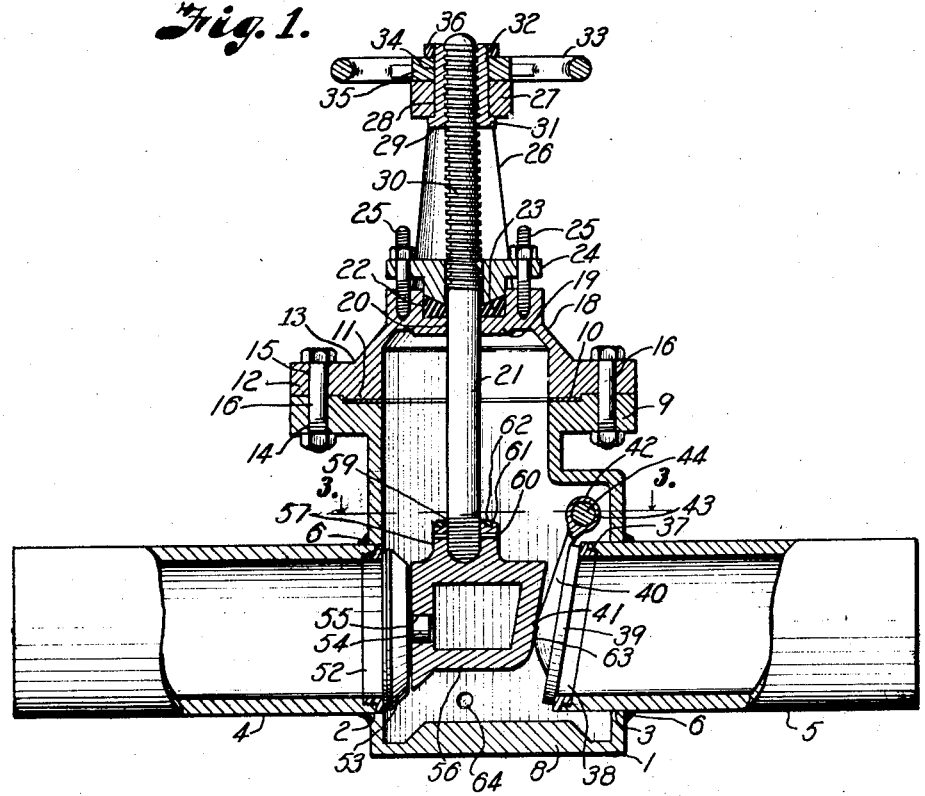
Fig. 1 is a central sectional view of a valve embodying my invention and shown in closed condition.
Figure 2:
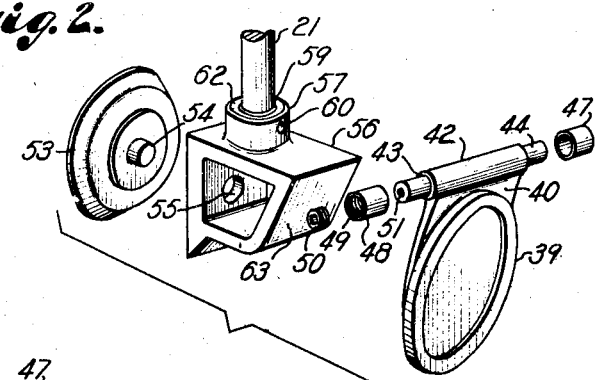
Fig. 2 is a perspective view of the valve plug assembly in disassembled relation.
Figure 3:
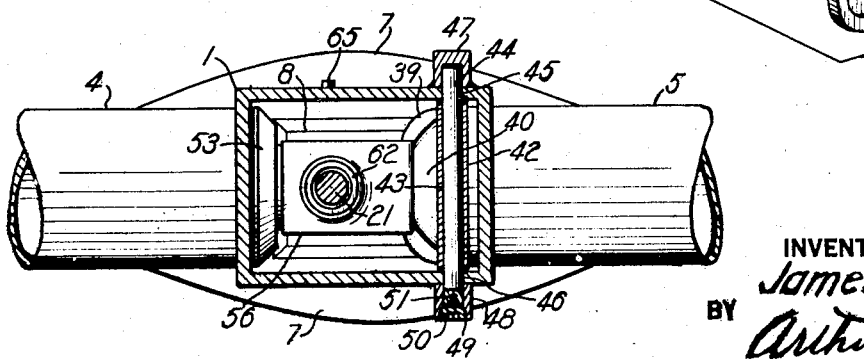
Fig. 3 is a horizontal section on the line 3—3 Fig. 1, particularly illustrating the method of mounting a check plate in the valve housing.

Referring more in detail to the drawing:

1 designates a valve housing preferably formed rectangular in shape and including transversely aligning openings 2 and 3 in its end walls for receiving axially aligning conduit sections 4 and 5 secured in the housing by welding or the like, as indicated at 6, and adapted to be interposed in a flow line by welding the conduit sections to the line.

Arcuate ribs 7 are welded longitudinally to opposite sides of the valve housing and conduit sections to further insure rigid connection of the sections with the housing. The lower end of the valve housing is closed by a plate 8 and the upper end terminates in an outwardly extending peripheral flange 9 having a recess 10 in its upper face for seating a complementary boss 11 on the lower face of a bonnet flange 12 formed integrally with a bonnet member 13.

Aligning openings 14 and 15 are provided in the flanges 9 and 12 respectively for receiving bolts 16 to firmly secure the bonnet on the valve housing.

An upper converging neck 18 of the bonnet includes a closed end wall 19 provided with an opening 20 for receiving a valve stem 21; and with a concentric socket 22 for seating packing material 23 urged into sealing relation with the stem by a gland 24 forced into the socket by adjusting bolts 25 threaded into the neck 18.

Spaced arms 26, extending upwardly from the neck 18 of the bonnet member are joined by an end portion 27 having an opening 28 aligning concentrically with the valve stem, and receiving a bearing nut 29 engaging the upper threaded end 30 of the stem. The nut is further provided on its lower end with a flange 31 adapted to bear against the lower face of the end portion 27, and its upper end is externally threaded, as indicated at 32.

An operating wheel 33, provided with an opening 34 in its hub 35, is mounted on the upper end of the nut and is fixed thereto by a lock nut 36 engaging the external threads of the bearing nut 29.

The apparatus thus far described is similar to that of my co-pending application Serial Number 458,552 and the invention in the present device includes particularly, the valve plug assembly employed for controlling flow of fluid through the valve housing.

As shown in Fig. 1 the conduit 5 extends inwardly into the housing and the inner end thereof is cut on a slight angle to produce an inwardly and downwardly slanting end face 37 into which is threaded a seating ring 38 adapted to cooperate with a check plate 39.

A rib 40, formed on the check plate and having a raised shoulder 41 for a purpose presently described, terminates in an ear 42 provided with an opening 43 for hingedly mounting the plate on a shaft 44 extended through transverse ports 45 and 46 in the valve housing. One end of the shaft is journalled in a cap or socket member 47 welded to one side wall of the housing. The opposite end of the shaft is journalled in a similar socket member 48 likewise welded to the opposite side wall of the housing and provided with internal threads 49 for receiving a plug screw 50 serving to retain the shaft in its journals.

In order to facilitate withdrawal of the shaft from the valve housing a threaded socket 51 is provided in its outer end and is adapted to receive an I-bolt or similar device for extracting the shaft.

The conduit section 4 extends into the housing to a point flush with the inner face of the housing wall and is also provided with a seating ring 52 for cooperating with a conical valve plate 53 having a concentric journal 54 rotatably mounted in the bearing opening 55 of a supporting wedge member 56.

An upwardly extending neck 57 of the wedge member is provided with an internally threaded socket 59 for receiving the lower threaded end of the valve stem 21, which is additionally secured thereto by a cross pin 60 extended through the neck and stem.

An annular recess 61 in the upper face of the neck portion is adapted to seat a sealing ring 62 for engaging the lower face of the end wall 19 of the bonnet member when the valve is in fully opened condition. The face 63 of the wedge member opposite the rotating valve plate is tapered for urging the check plate and the rotating plate on their respective seats when the valve stem is threaded downwardly into the housing.

A drain opening 64 in one side wall of the housing adjacent its lower end is normally closed by a plug screw 65 so that liquid may be drained from the housing when desired.

A valve constructed and assembled as described is mounted in a flow line with the check plate directed toward the up-stream side. Upon opening the valve by elevating the stem the check valve is swung outwardly from its seat by the pressure of fluid flowing through the line. Should the back pressure of the fluid in the line become greater than the flowing pressure the check valve will immediately close by force of gravity, thereby preventing return fo fluid through the line.

When closing the valve, both the check plate and the rotatable plate are forced firmly into engagement with their respective seats by the wedging action of the supporting member, and leakage of fluid into the valve body is effectively prevented.

What I claim and desire to secure by Letters Patent is:

1. In a device of the character described, a housing having transverse openings, conduit sections extending into said openings and forming opposite valve seats, longitudinal ribs on the housing and said sections for uniting said members, a valve plug assembly in said housing including a supporting member, a valve plate rotatably mounted on said member in transverse sliding relation with one seat, and a second valve plate mounted in the housing in swinging relation with the opposite seat.

2. In a device of the character described, a housing having transverse openings, conduit sections extending into said openings and forming opposite valve seats, longitudinal ribs welded to the housing and to said sections for uniting and reinforcing said members, and a valve plug assembly in said housing including valve plates adapted to engage said seats.

JAMES F. BLAKE.